(12) United States Patent
Zafarana et al.

(10) Patent No.: US 8,878,503 B2
(45) Date of Patent: Nov. 4, 2014

(54) VOLTAGE REGULATOR WITH COMPENSATION TO INHIBIT UNDERSHOOT

(75) Inventors: Alessandro Zafarana, Milan (IT); Osvaldo Enrico Zambetti, Milan (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 275 days.

(21) Appl. No.: 13/238,436

(22) Filed: Sep. 21, 2011

(65) Prior Publication Data

US 2012/0081090 A1  Apr. 5, 2012

(30) Foreign Application Priority Data

Oct. 4, 2010  (IT) ................. VA2010A0073

(51) Int. Cl.
*H02M 3/156* (2006.01)
*H02M 1/00* (2006.01)
(52) U.S. Cl.
CPC ...... *H02M 3/156* (2013.01); *H02M 2001/0025* (2013.01); *H02M 2001/0022* (2013.01)
USPC .......................................... 323/282
(58) Field of Classification Search
USPC .......................................... 323/282, 285, 286
See application file for complete search history.

(56) References Cited

U.S. PATENT DOCUMENTS

| 6,628,110 | B2  |  9/2003 | Zafarana et al. | 323/284 |
|---|---|---|---|---|
| 6,680,604 | B2 * |  1/2004 | Muratov et al. | 323/285 |
| 7,486,061 | B2 * |  2/2009 | Umemoto et al. | 323/282 |
| 7,535,211 | B2 * |  5/2009 | Isham | 323/284 |
| 2002/0125871 | A1 |  9/2002 | Groom et al. | 323/284 |
| 2004/0240238 | A1 | 12/2004 | Jauregui et al. | 363/50 |
| 2006/0226822 | A1 | 10/2006 | Xu et al. | 323/283 |
| 2007/0273348 | A1 | 11/2007 | Isham | 323/282 |
| 2010/0072970 | A1 |  3/2010 | Ouyang | 323/293 |

FOREIGN PATENT DOCUMENTS

WO  WO2006/086674  8/2006

OTHER PUBLICATIONS

Kaiwei et al., "Optimal Design of the Active Droop Control Method for the Transient Response", APEC 2003, 18th, Annual IEEE Applied Power Electronics Conference and Exposition, Miami Beach, FL, Feb. 9-13, 2003, [Annual Applied Power Electronics Conference], New York, NY, IEEE, US. pp. 718-723.

* cited by examiner

*Primary Examiner* — Harry Behm
(74) *Attorney, Agent, or Firm* — Allen, Dyer, Doppelt, Milbrath & Gilchrist, P.A.

(57) ABSTRACT

The voltage regulators are capable of limiting undershoots of the output voltage without having a similar effect on overshoots because of the presence of a current cancellation network, input with the reference voltage and coupled to the second input of the error amplifier. This current cancellation network is adapted to inject into the second input a unidirectional compensation current of the first and second currents injected by the first and second feedback networks, respectively, the compensation current being determined by time variations of the difference between a replica of the output regulated voltage and the reference voltage and/or by time variations of the reference voltage.

19 Claims, 10 Drawing Sheets

(A) AVERAGE MODEL OF THE VOLTAGE REGULATOR WITH AVP CONTROL (B) OUTPUT VOLTAGE VS. LOAD CURRENT (A) BLOCK DIAGRAM

VOLTAGE REGULATOR WITH COMPENSATION TO INHIBIT UNDERSHOOT

FIELD OF THE INVENTION

The invention relates in general to voltage regulators and more particularly to regulators with compensation networks for compensating effects due to variations of a reference voltage.

BACKGROUND OF THE INVENTION

Voltage regulators generate a constant DC output voltage and contain circuits that keep the output voltage on a supplied load at a regulated value. This task is typically accomplished using a switching power stage, the switches of which are turned on/off by respective driver circuits.

Modern microprocessors are supplied by voltage regulators and are capable of modifying their supply voltage to minimize power consumption, for example when the microprocessor is in a state of low-power consumption (standby). In practice, microprocessors are controlled by voltage regulators such that the voltage Vo supplied to them tracks a reference voltage Vref, as shown in FIG. 1. When the supplied microprocessor enters a state of low-power consumption, the reference voltage is reduced at a relatively slow rate (typically 2.5 mV/µs) and it is eventually increased at a relatively fast rate (typically, more than 10 mV/µs) when the microprocessor must quickly resume from a standby state.

A classic architecture of a switching regulator for supplying a microprocessor is shown by way of example in FIG. 2 and comprises an operational amplifier E/A, a comparator that generates a PWM signal by comparing the output of the error amplifier E/A with a ramp signal Vramp, and a switching power stage controlled by the PWM signal that generates the output voltage Vo with which the microprocessor is supplied. The regulator typically has a feedback line for generating an error signal as the difference between a filtered replica of the output voltage Vo and a reference voltage Vref. The difference between the output voltage Vo and the reference voltage Vref is compared with the ramp voltage Vramp and the PWM driving signal is generated as a function of this comparison, as usually done in PWM control circuits.

To reduce power consumption, microprocessors are usually equipped with a second feedback loop, as shown in FIG. 3, for reducing the voltage on the microprocessor by an amount proportional to the current absorbed by the microprocessor, such to keep constant the output impedance of the regulator. Such a control technique is disclosed for example in U.S. Pat. No. 6,628,110 to the present Assignee.

This technique involves:
  accurate design of a compensation network capable of keeping constant the output impedance in a 0-1 MHz frequency interval when the reference voltage Vref is constant;
  optimization of the output voltage for reducing power consumption when the load is constant but the reference voltage increases for making the microprocessor resume from a low-power consumption state; or
  optimization of the output voltage for reducing power consumption when the load is constant but the reference voltage decreases.

To prevent undue turn off of the microprocessor, the output voltage should not undershoot.

Typical voltage profiles of the circuit scheme of FIG. 3 are shown in FIG. 11. It may be noted that the ramp voltage Vramp has a certain offset to make the comparator, that generates the PWM driving signal by comparing the voltage Vcomp with the voltage Vramp, operate in a proper functioning region.

When current absorption by the supplied load drops, the comparison voltage Vcomp becomes practically null and an overshoot of the output voltage occurs. In case of a resume event of the supplied microprocessor from a low-power state, the comparison voltage Vcomp may take a relatively long time for crossing the ramp voltage Vramp causing an undershoot of the output voltage.

It would be desirable to have a switching DC-DC regulator architecture capable of limiting undershoots of the output voltage caused by fluctuations of the reference voltage Vref though allowing a fast resumption from a standby state.

The published U.S. Patent Application No. 2007/0273348 in the name of Intersil Americas Inc. discloses a PWM voltage regulator, depicted in FIG. 4, that includes an error amplifier input with a reference voltage Vref and a filtered replica of the output voltage, connected in a way to control a PWM power stage, and a cancellation network that injects into the error amplifier a current representative of the time derivative of the reference voltage. The voltage regulator of this prior disclosure may be effective in canceling both undershoots and overshoots of the output voltage with a same circuital network.

However, a drawback of using the voltage regulator disclosed in such reference, is that the output voltage increases too slowly and this delays resumption from standby of the supplied microprocessors.

SUMMARY OF THE INVENTION

Contrary to the common practice in this field, the present inventors consider overshoots of the output voltage, in case of a sudden increase of the reference voltage, beneficial to making the supplied microprocessor resume more quickly from a stand-by state. Of course, undershoots must continue to be prevented because of the risk of causing an undue turn off the supplied microprocessor.

To limit undershoots of the output voltage, known voltage regulators are equipped with feedback lines designed for limiting undershoots as required by specifications, notwithstanding the consequence that these feedback lines also slow down the surge of the output voltage when the reference voltage is rapidly increased.

A voltage regulator architecture that is allowed to adjust separately compensations of undershoots and of overshoots, could prevent undershoots while allowing beneficial overshoots of the output voltage, thus preventing any risk of turning accidentally off a supplied microprocessor and at the same time ensuring a fast resumption from a low-power consumption state.

The present invention provides architectures of DC-DC switching regulators capable of limiting undershoots and also overshoots of the output voltage though in an independent manner or measure.

The switching regulator may include: an output power stage driven by a control voltage and adapted to generate the regulated voltage; a first error amplifier adapted to produce the control voltage on an output terminal, adapted to receive the reference voltage on a first input terminal; a first feedback network connected between the output of the regulator and a second input terminal of the first error amplifier; and a second feedback network connected between the output terminal of the first error amplifier and the same second input terminal thereof.

The regulators of the present invention are capable of limiting undershoots of the output voltage without having a similar effect on overshoots because of the presence of a current cancellation network, input with the reference voltage and coupled to the second input of the error amplifier. This current cancellation network is adapted to inject into the second input a unidirectional compensation current of the first and second currents injected by the first and second feedback networks, respectively, the compensation current being determined by time variations of the difference between a replica of the output regulated voltage and the reference voltage and/or by time variations of the reference voltage.

Preferably, the current cancellation network is adapted to inject into the second input a compensation current, that is such to compensate the current through the first and second feedback networks, determined by increasing time variations of the difference between a replica of the output regulated voltage and the reference voltage and/or by increasing time variations of the reference voltage. If required, the overshoots of the output voltage may be independently limited with a dedicated R-C network distinct from the cancellation network.

DETAILED DESCRIPTION OF THE PREFERRED EMBODIMENTS

Tests carried out by the inventors showed that it is possible to limit undershoots and overshoots of the output voltage separately one from the other.

Figure 5:
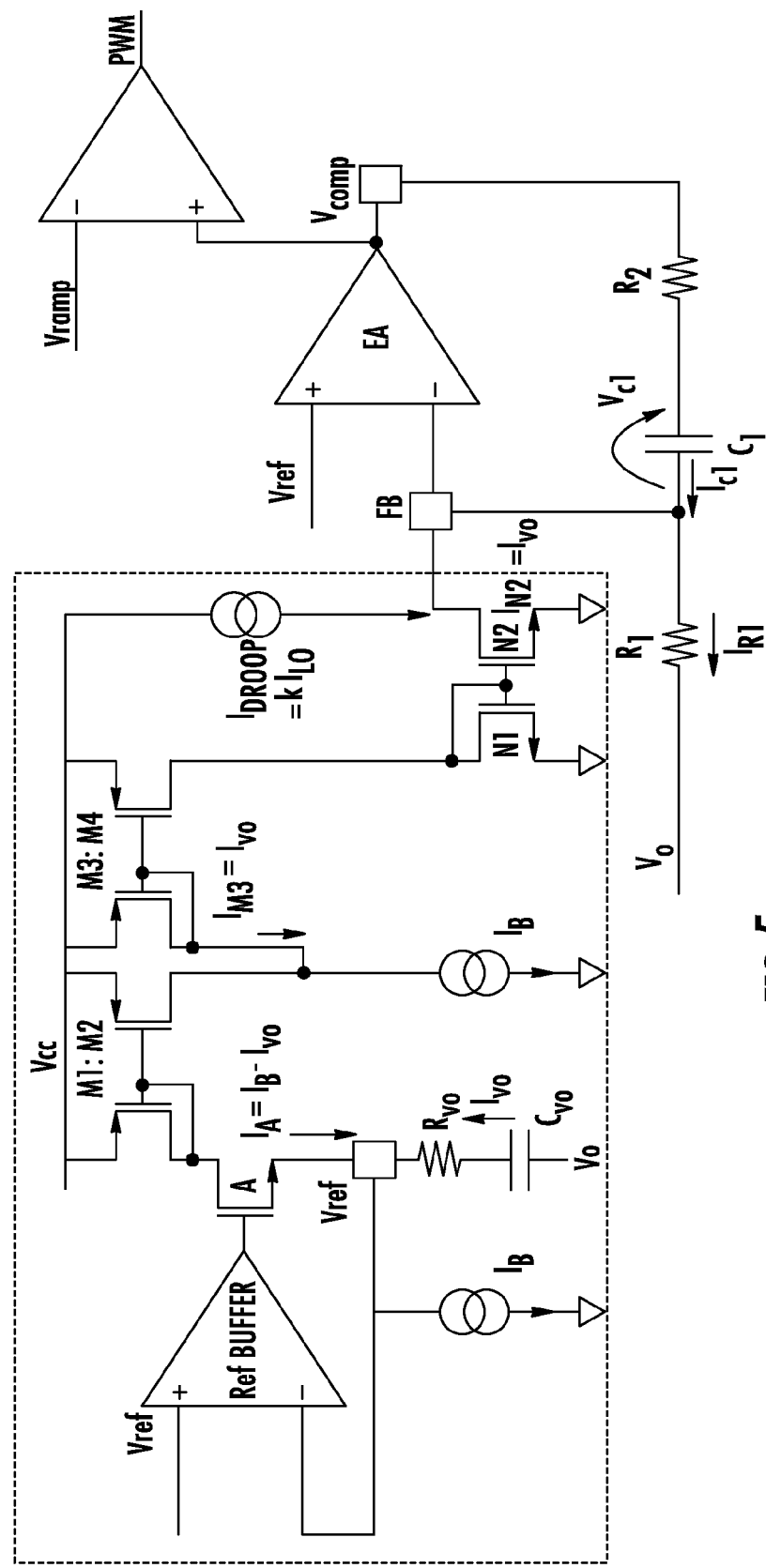
FIG. 5 is a schematic diagram illustrating an embodiment of the circuit that generates a PWM driving signal for the power stage of a voltage regulator according to the present invention, and having a current cancellation network that generates a compensation current that does not invert its sign.

An embodiment of a voltage regulator is depicted in FIG. 5. Similar to known voltage regulators, it has an error amplifier EA, that generates the comparison voltage Vcomp by comparing the reference voltage Vref with the feedback voltage on the feedback node FB, and a comparator that generates the PWM driving signal by comparing the voltage Vcomp with the ramp voltage Vramp.

The illustrated voltage regulator is capable of compensating only undershoots and not overshoots because it has a cancellation network, that in the figure is enclosed within dashed borders, that drains a current Ivo from the node FB only when the current $I_A$ is positive, i.e. when Ivo<$I_B$. The current Ivo is determined by the difference between the output voltage Vo and the reference voltage Vref and is positive when the reference voltage decreases faster than the output voltage Vo or increases slower than the output voltage.

Therefore, in case of a sudden increase of the reference voltage or of a sudden decrease of the output voltage, the depicted compensation network acts such to make the output voltage follow quickly the reference voltage, thus preventing any risk of undershoot. By contrast, in case of a sudden decrease of the reference voltage in respect to the output voltage Vo, the current Ivo should invert, but this should not be possible because the current mirror M1:M2 does not allow this to occur. Therefore, the compensation network turns off and no compensation current Ivo is injected in the feedback node FE, thus allowing overshoots of the output voltage.

Figure 6:
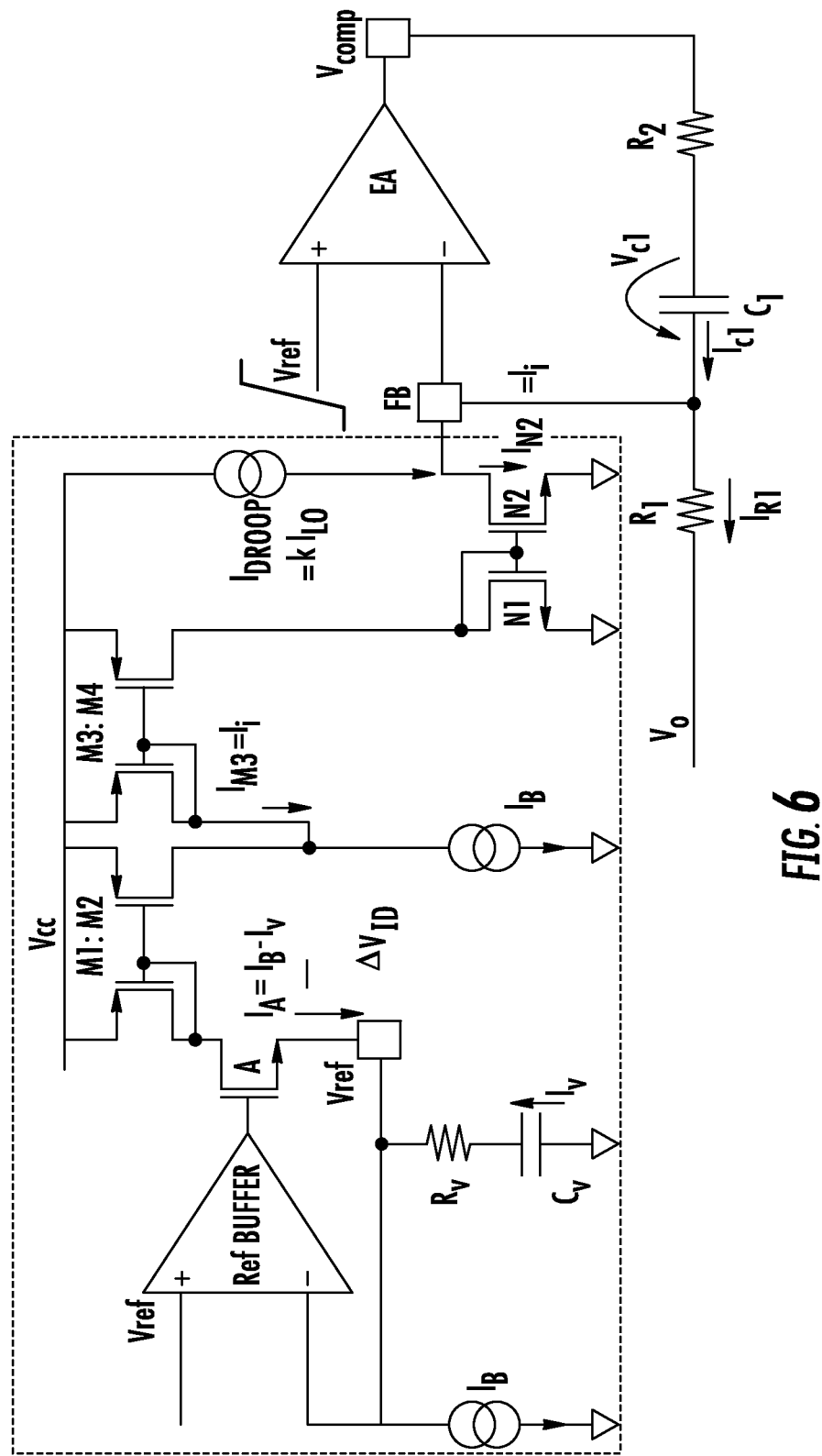
FIG. 6 is a schematic diagram illustrating another embodiment of the circuit that generates a PWM driving signal for the power stage of a voltage regulator according to the present invention, and having a current cancellation network that generates a compensation current that does not invert its sign.

According to another embodiment depicted in FIG. 6, differently from the circuit of FIG. 5, the R-C network connected to the node REF is referred to ground. The operation is similar to that of the circuit of FIG. 5, though the current Iv is determined only by variations of the reference voltage Vref.

Figure 1:
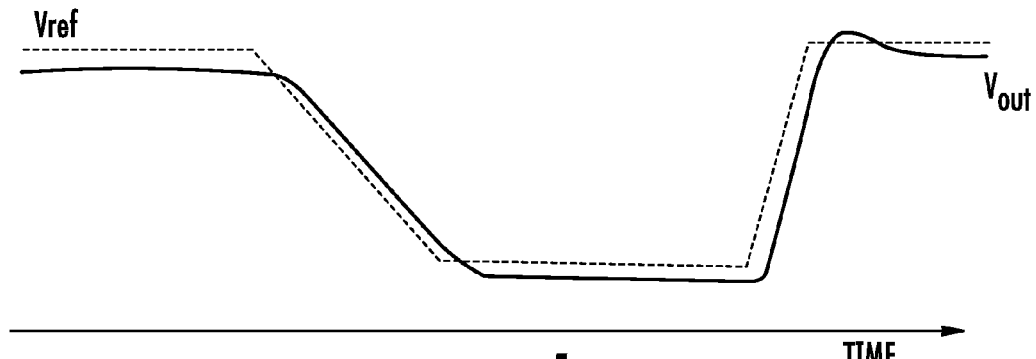
FIG. 1 is an exemplary time diagram of the reference voltage and of the output voltage of a regulator.
Figure 3:
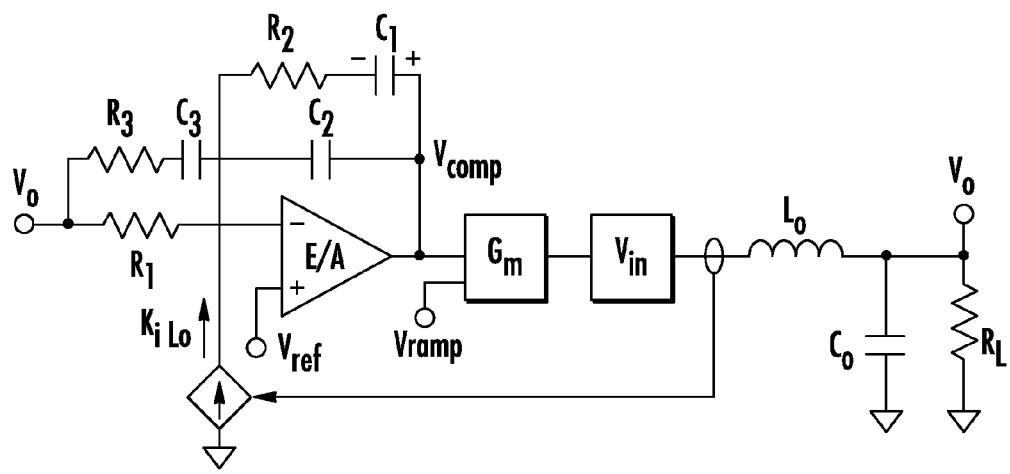
FIG. 3 is a schematic diagram illustrating a switching voltage regulator with AVP control, according to the prior art, and the current-voltage characteristic that describes the control action.
Figure 3:
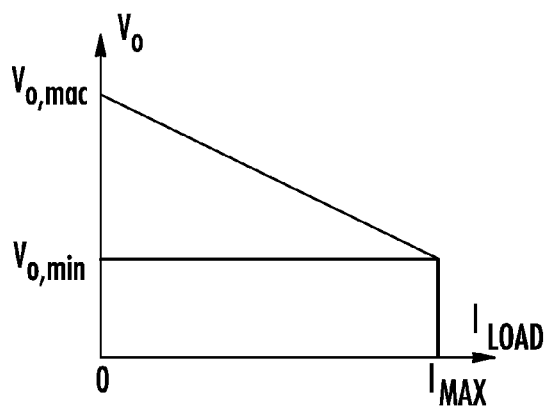
Figure 2:
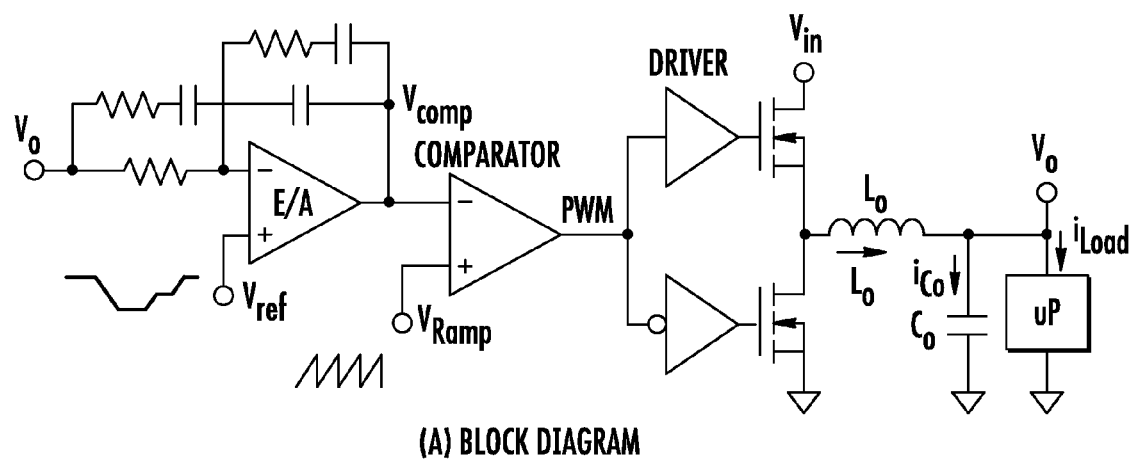
FIG. 2 is a schematic diagram illustrating a switching voltage regulator and its equivalent circuit according to the prior art.
Figure 2:
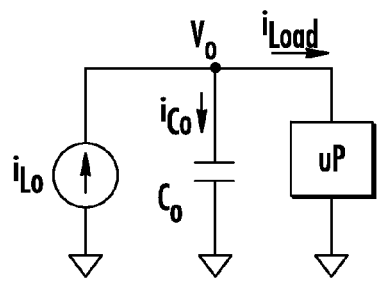
Figure 4:
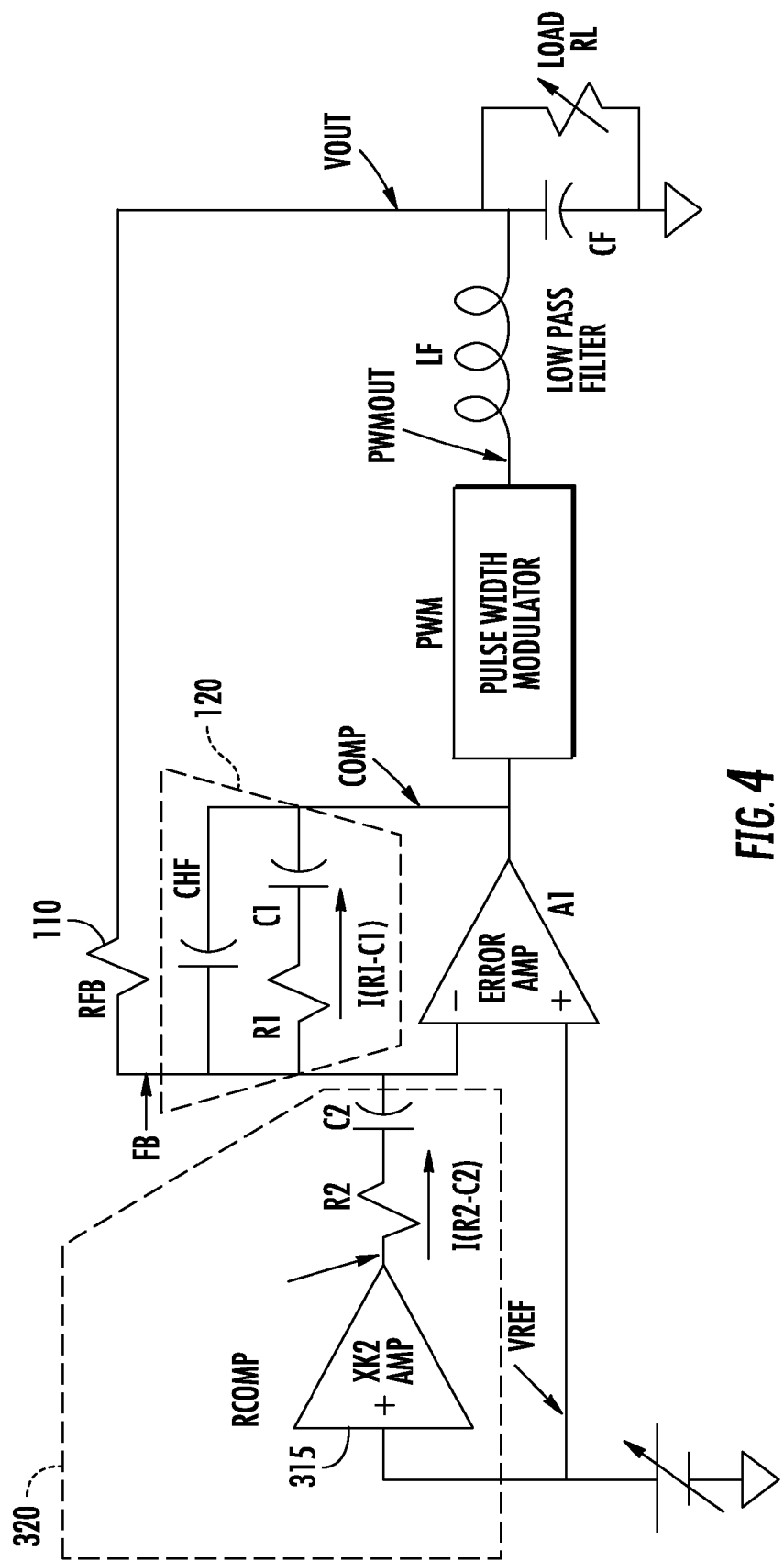
FIG. 4 is a schematic diagram illustrating the switching voltage regulator disclosed in U.S. 2007/273348.

It is worth noting that a voltage regulator with a network capable of generating an unidirectional cancellation current may be obtained by using the architecture shown in FIG. 4 as a starting point. Referring to the voltage regulator depicted in FIG. 4, a diode may be connected between the amplifier XK2 AMP and the resistor R2, or between the resistor R2 and the capacitor C2, or between the capacitor C2 and the node FB, and may be capable of generating a unidirectional compensation current suitable for preventing or limiting undershoots while allowing overshoots of the output voltage.

Figure 7:
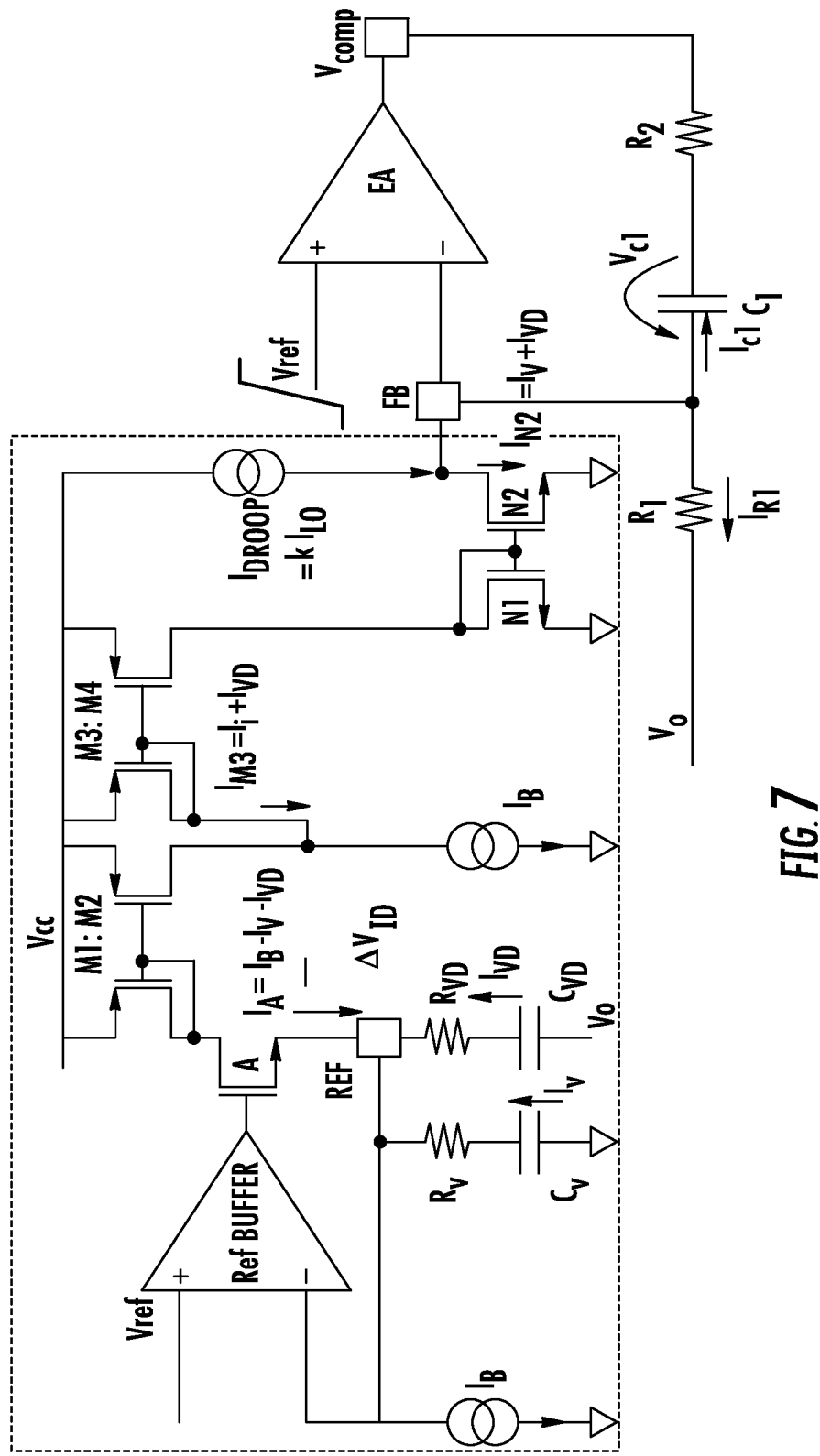
FIGS. 7 to 10 are schematic diagrams illustrating other embodiments of the circuit that generates a PWM driving signal for the power stage of a voltage regulator according to the present invention, and having a current cancellation network that generates a compensation current that does not invert its sign.

The circuit of FIG. 7 combines the approaches depicted in FIGS. 5 and 6, to have a more accurate compensation of the output voltage in case of a sudden decrease of the reference voltage.

Figure 8:
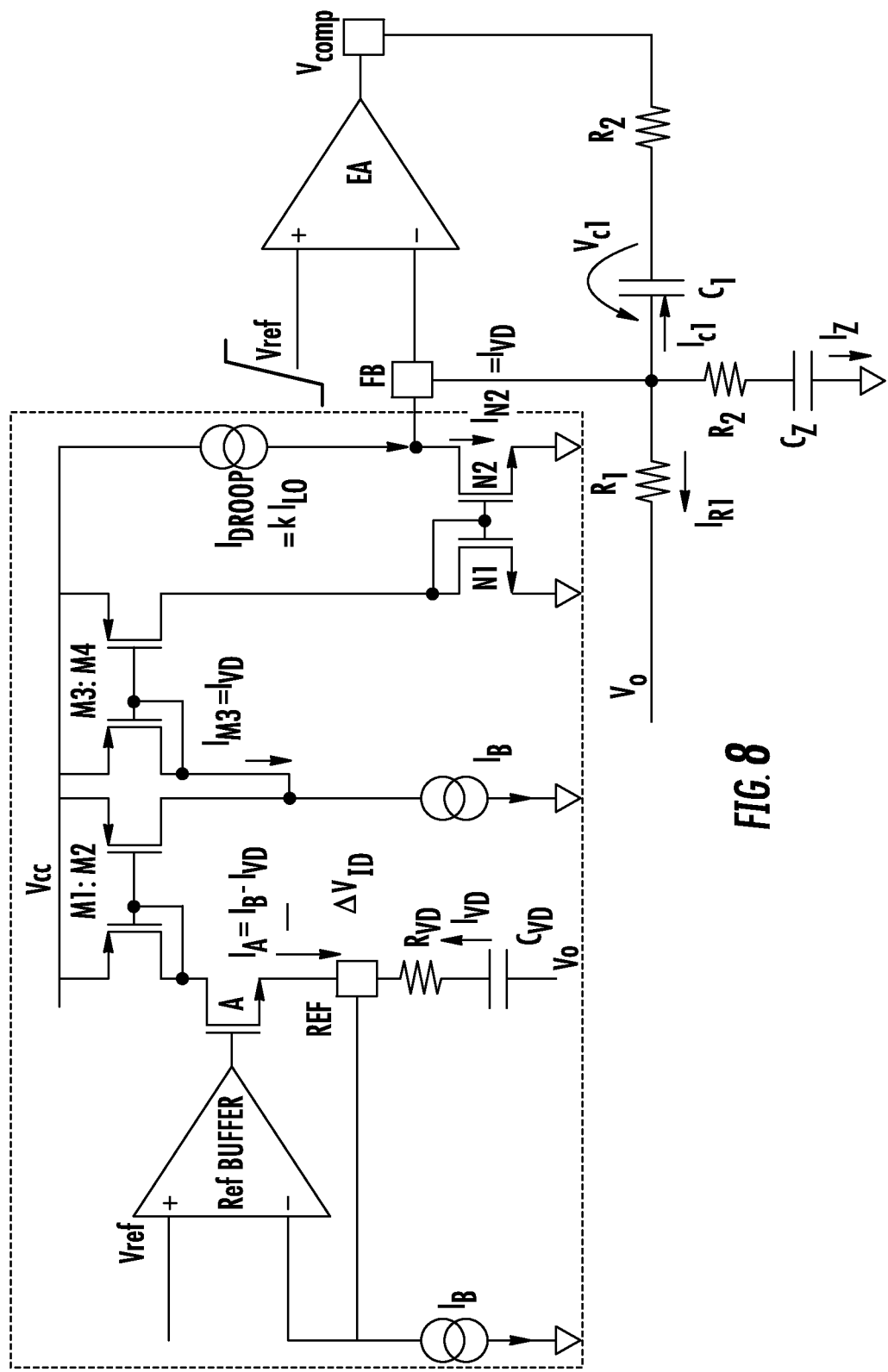

According to yet another embodiment, depicted in FIG. 8, the circuit of FIG. 5 may be equipped with a further R-C network Rz-Cz connected to the feedback node FB for compensating eventual overshoots of the output voltage Vo. It should be noted that this last R-C network does not cause any undershoots because, when the output voltage decreases, the current Ivo+Iv injected in the node FB compensates the currents Ic1 and Iz.

Figure 9:
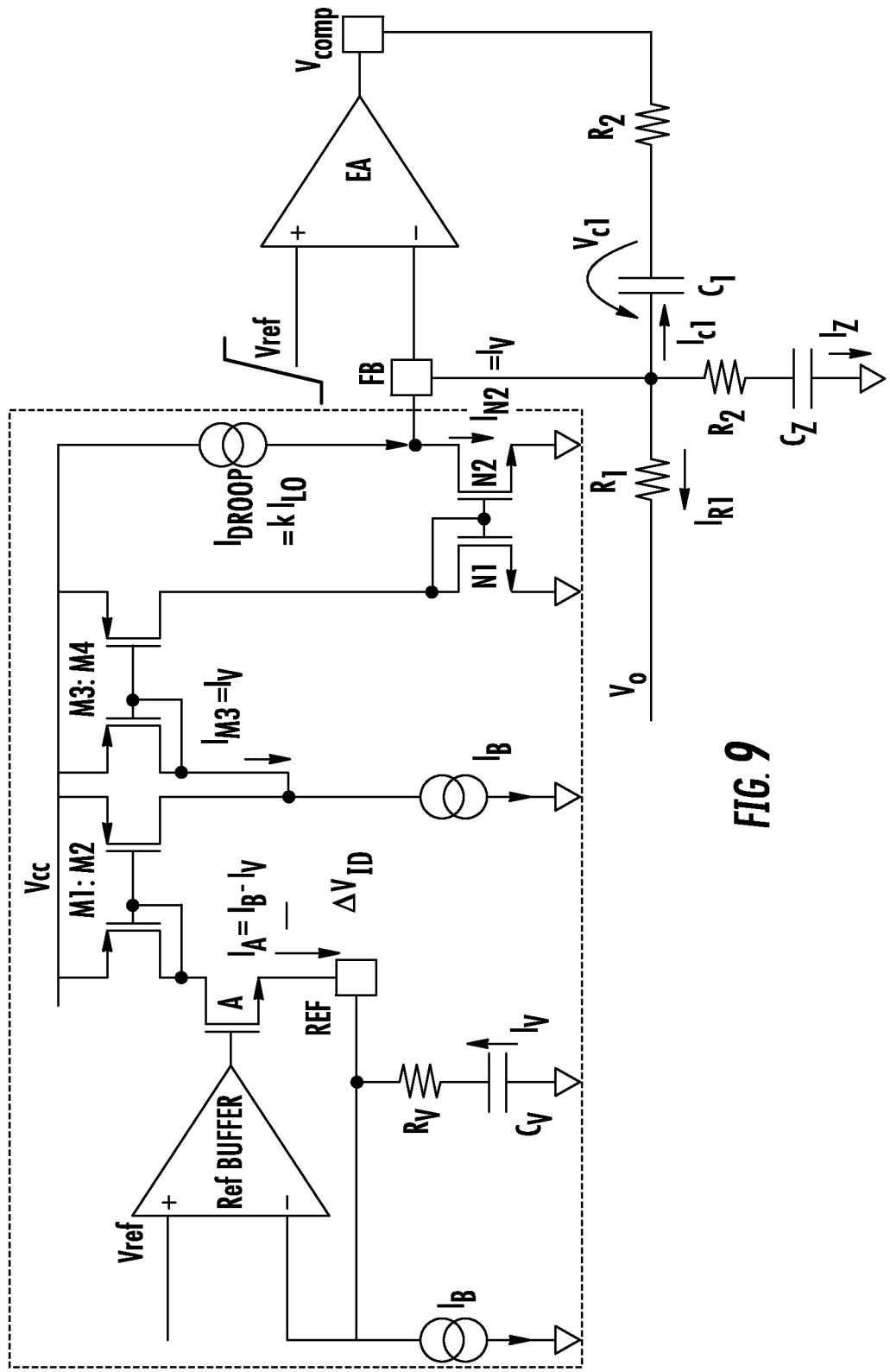
Figure 10:
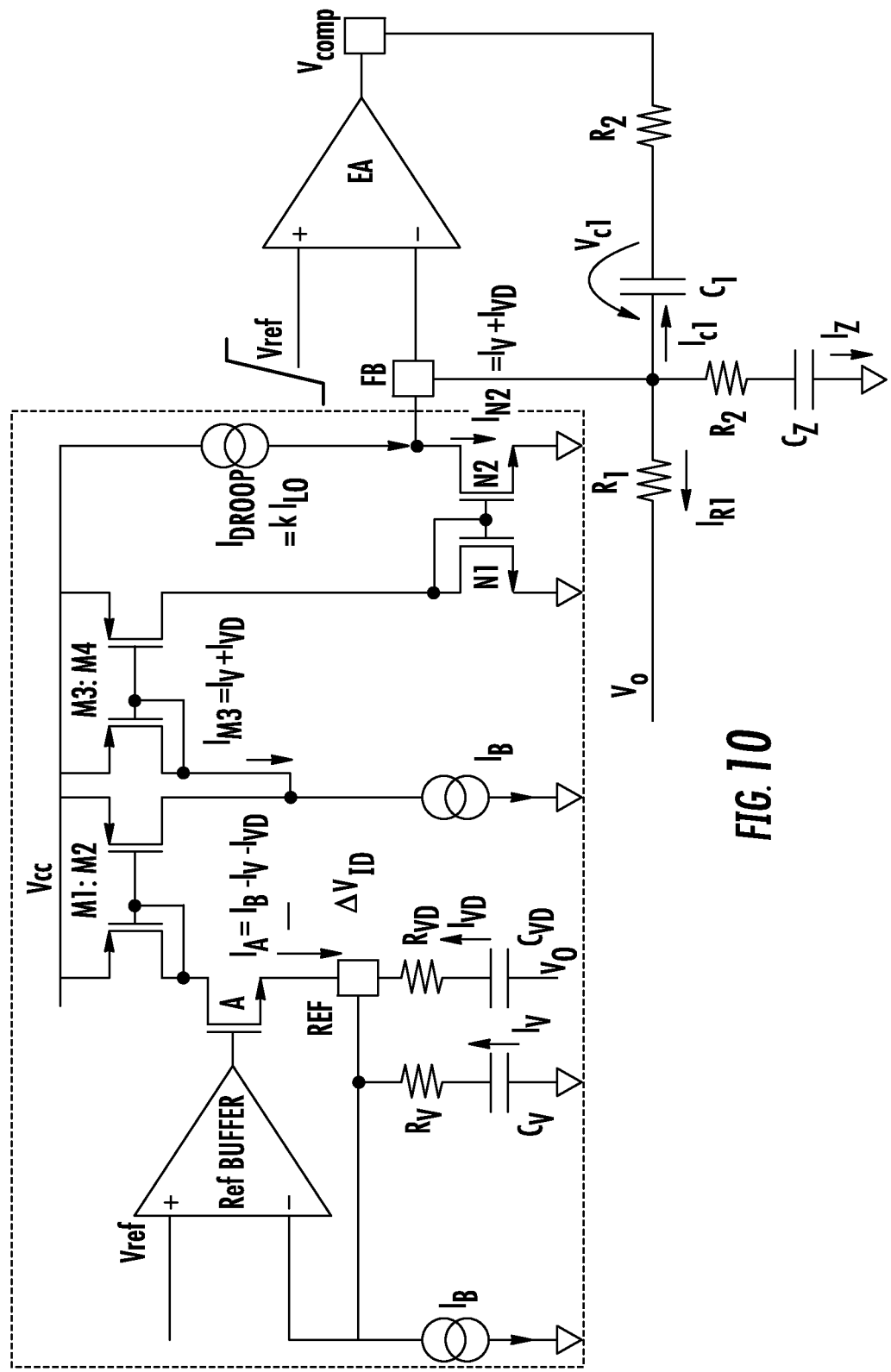

The network Rz-Cz may be added also to the circuits of FIGS. 6 and 7, as shown in FIGS. 9 and 10, and even to the voltage regulator, described above though not shown in the figures, based on the architecture of the cited U.S. patent application in the name of Intersil.

Figure 11:
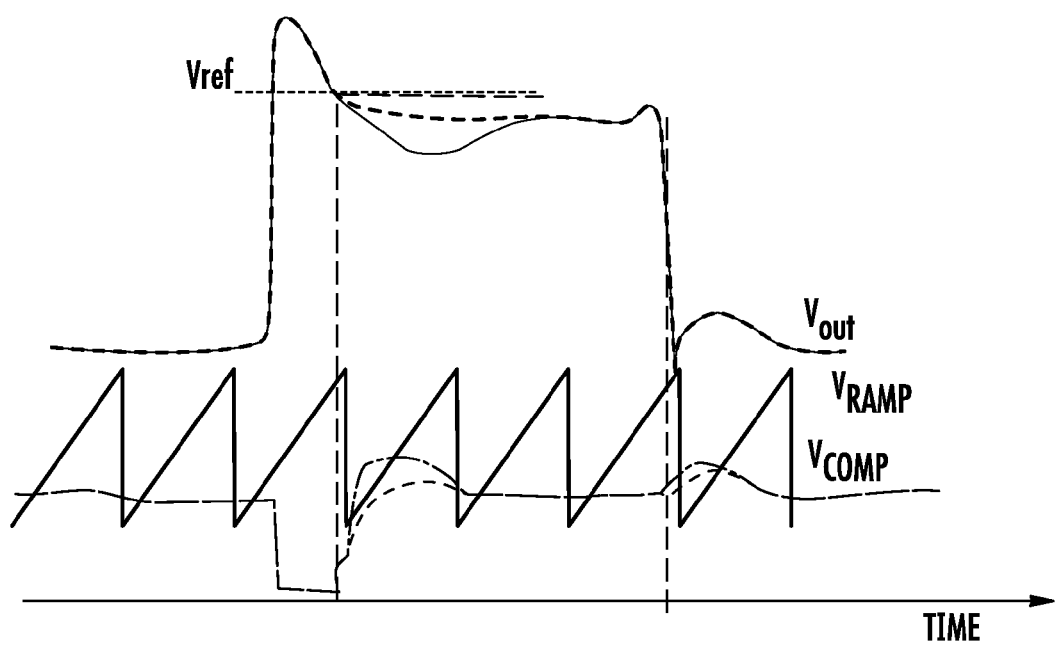
FIG. 11 is a timing diagram illustrating a comparison of the main signals of the voltage regulators of FIG. 3 and of FIG. 10.

FIG. 11 shows the improvements in the profiles of the output voltage Vo and of the comparison voltage Vcomp obtained with the voltage regulator of FIG. 10. As shown by the dashed lines, the comparison voltage Vcomp increases more readily than in prior voltage regulators and thus undershoots of the output voltage Vo are strongly limited. The depicted time graph shows that, differently from prior voltage regulators, overshoots caused by abrupt reductions of the current absorbed by the load are efficiently limited without limiting the surge of the output voltage when the reference voltage rapidly increases.

This beneficial effect is caused by the same network Rvo-Cvo. Indeed, when the reference voltage remains constant and the output voltage increases because of a reduction of the current absorbed by the supplied load, the network Rvo-Cvo injects a compensation current in the node FB as if the reference voltage was reduced.

When the reference voltage Vref is increased for making the supplied microprocessor resume from a stand-by state, the current mirrors of the voltage regulator of FIG. 10 do not inject any compensation current in the node FB as long as the reference voltage Vref is increasing, even if the output voltage is increasing, because the current through the network Rvo-Cvo is flowing in the opposite direction in respect to that permitted by the current mirrors. Therefore, the output voltage is allowed to increase without being slowed down. By contrast, when the reference voltage stops increasing, the current flowing through the network Rvo-Cvo inverts and is injected in the node FB for limiting the overshoot of the output voltage.

That which is claimed:

1. A voltage regulator configured to generate on an output node a regulated voltage that is substantially a replica of a reference voltage provided on an input node of the regulator, comprising:
    a power stage driven by a control voltage and configured to generate the regulated voltage;
    a first error amplifier configured to generate the control voltage on an output terminal, and configured to receive the reference voltage on a first input terminal;
    a first feedback network connected between said output node of the voltage regulator and a second input terminal of the first error amplifier;
    a second feedback network connected between said output terminal of the first error amplifier and said second input terminal thereof;
    a current cancellation network input with the reference voltage and coupled to said second input of the error amplifier, configured to inject into said second input a unidirectional compensation current configured to compensate first and second currents of said first and second feedback networks, respectively, the compensation current being determined by at least one of time variations of a difference between a replica of the output regulated voltage and the reference voltage, and of time variations of the reference voltage;
    wherein said cancellation network comprises
        a second error amplifier configured to receive the reference voltage on a first input,
        a cascode stage configured to be biased in a conduction state and controlled by said second error amplifier and having a current terminal shorted to a second input of the second error amplifier,
        a third feedback network connected between said second input terminal of the second error amplifier and to at least one of said output of the voltage regulator and a node at a reference potential, and configured to generate a third current representative of at least one of a time derivative of the difference between the reference voltage and the output regulated voltage, and of the time derivative of the reference voltage,
        a mirroring network coupled between another current terminal of said cascode stage and said second input of the first error amplifier, configured to inject the third current into said second input of the first error amplifier when the third current assumes a predetermined sign.

2. The voltage regulator of claim 1, wherein said current cancellation network is configured to inject into said second input the compensation current that is to compensate the current through said first and second feedback networks determined by increasing time variations of the difference between the replica of the output regulated voltage and the reference voltage and/or by increasing time variations of said reference voltage.

3. The voltage regulator of claim 2, wherein said mirroring network comprises:
    a first current mirror having an input line in series with said cascade stage;
    a second current mirror having an input line connected in parallel to an output line of said first current mirror and to a network configured to draw a fixed current therefrom such to make the second current mirror being crossed by said third current; and
    a third current mirror in cascade to said second current mirror, having an output terminal connected to said second input of the first error amplifier.

4. The voltage regulator of claim 2, further comprising an R-C network connected between said second input terminal of the first error amplifier and a node at a reference potential.

5. The voltage regulator of claim 4, further comprising at least one of:
    a second R-C network connected between said second input terminal of the second error amplifier and a node at a reference potential; and
    a third R-C network connected between said second input terminal of the second error amplifier and said output node of the voltage regulator at the regulated output voltage.

6. The voltage regulator of claim 2, further comprising a fourth feedback network connected to inject into said second input of the first error amplifier a fourth current representative of an output current delivered by the voltage regulator.

7. A voltage regulator comprising:
    a power stage driven by a control voltage and configured to generate a regulated voltage;
    a first error amplifier configured to generate the control voltage on an output terminal, and configured to receive a reference voltage on a first input terminal;
    a first feedback network connected between an output of the voltage regulator and a second input terminal of the first error amplifier;
    a second feedback network connected between said output terminal of the first error amplifier and said second input terminal thereof;
    a current cancellation network input with the reference voltage and coupled to said second input of the error amplifier, configured to inject into said second input a compensation current which is determined by at least one of time variations of a difference between a replica of the output regulated voltage and the reference voltage, and of time variations of the reference voltage;
    wherein said cancellation network comprises
        a second error amplifier configured to receive the reference voltage on a first input,
        a cascode stage configured to be biased in a conduction state and controlled by said second error amplifier and having a current terminal shorted to a second input of the second error amplifier,
        a third feedback network connected between said second input terminal of the second error amplifier and to at least one of said output of the voltage regulator and a node at a reference potential, and configured to generate a third current representative of at least one of a time derivative of the difference between the reference voltage and the output regulated voltage, and of the time derivative of the reference voltage, a mirroring network coupled between another current terminal of said cascode stage and said second input of the first error amplifier, configured to inject the third current into said second input of the first error amplifier when the third current assumes a predetermined sign.

8. The voltage regulator of claim 7, further comprising at least one of:

an R-C network connected between said second input terminal of the second error amplifier and a node at a reference potential; and an R-C network connected between said second input terminal of the second error amplifier and the output the voltage regulator.

9. The voltage regulator of claim 7, wherein said current cancellation network is configured to inject into said second input the compensation current determined by increasing time variations of the difference between the replica of the output regulated voltage and the reference voltage and/or by increasing time variations of said reference voltage.

10. The voltage regulator of claim 9, wherein said mirroring network comprises:

a first current mirror having an input line in series with said cascode stage;

a second current mirror having an input line connected in parallel to an output line of said first current mirror and to a network configured to draw a fixed current therefrom such to make the second current mirror being crossed by said third current; and a third current mirror in cascade to said second current mirror, having an output terminal connected to said second input of the first error amplifier.

11. The voltage regulator of claim 9, further comprising an R-C network connected between said second input terminal of the first error amplifier and a node at a reference potential.

12. The voltage regulator of claim 9, further comprising a fourth feedback network connected to inject into said second input of the first error amplifier a fourth current representative of an output current delivered by the voltage regulator.

13. A method of generating a regulated voltage, on an output node of voltage regulator, that is substantially a replica of a reference voltage provided on an input node of the regulator, the method comprising:

driving a power stage with a control voltage and configured to generate a regulated voltage;

generating the control voltage on an output terminal of a first error amplifier which receives a reference voltage on a first input terminal;

connecting a first feedback network between an output of the voltage regulator and a second input terminal of the first error amplifier;

connecting a second feedback network between said output terminal of the first error amplifier and said second input terminal thereof;

inputting a current cancellation network with the reference voltage and injecting into said second input terminal of the first error amplifier a compensation current which is determined by at least one of time variations of a difference between a replica of the output regulated voltage and the reference voltage, and of time variations of the reference voltage;

wherein said cancellation network comprises a second error amplifier configured to receive the reference voltage on a first input, a cascode stage configured to be biased in a conduction state and controlled by said second error amplifier and having a current terminal shorted to a second input of the second error amplifier, a third feedback network connected between said second input terminal of the second error amplifier and to at least one of said output of the voltage regulator and a node at a reference potential, and configured to generate a third current representative of at least one of a time derivative of the difference between the reference voltage and the output regulated voltage, and of the time derivative of the reference voltage, a mirroring network coupled between another current terminal of said cascode stage and said second input of the first error amplifier, configured to inject the third current into said second input of the first error amplifier when the third current assumes a predetermined sign.

14. The method of claim 13, wherein said current cancellation network is configured to inject into said second input the compensation current determined by increasing time variations of the difference between the replica of the output regulated voltage and the reference voltage and/or by increasing time variations of said reference voltage.

15. The method of claim 13, wherein said mirroring network comprises:

a first current mirror having an input line in series with said cascode stage;

a second current mirror having an input line connected in parallel to an output line of said first current mirror and to a network configured to draw a fixed current therefrom such to make the second current mirror being crossed by said third current; and a third current mirror in cascade to said second current mirror, having an output terminal connected to said second input of the first error amplifier.

16. A voltage regulator configured to generate on an output node an output regulated voltage that is substantially a replica of a reference voltage provided on an input node of the regulator, comprising:

a power stage driven by a control voltage and configured to generate the regulated voltage;

a first error amplifier configured to generate the control voltage on an output terminal, and configured to receive the reference voltage on a first input terminal;

a first feedback network connected between said output node of the voltage regulator and a second input terminal of the first error amplifier;

a second feedback network connected between said output terminal of the first error amplifier and said second input terminal thereof;

a current cancellation network input with the reference voltage and coupled to said second input of the error amplifier, configured to inject into said second input a unidirectional compensation current configured to compensate first and second currents of said first and second feedback networks, respectively, the compensation current being determined by time variations of a difference between a replica of the output regulated voltage and the reference voltage to inhibit undershoot of the output regulated voltage.

17. The voltage regulator of claim 16, wherein said current cancellation network is configured to inject into said second input the compensation current that is to compensate the current through said first and second feedback networks determined by increasing time variations of the difference between the replica of the output regulated voltage and the reference voltage.

18. A method of generating a regulated voltage, on an output node of voltage regulator, that is substantially a replica of a reference voltage provided on an input node of the regulator, the method comprising:
- driving a power stage with a control voltage and configured to generate a regulated voltage;
- generating the control voltage on an output terminal of a first error amplifier which receives a reference voltage on a first input terminal;
- connecting a first feedback network between an output of the voltage regulator and a second input terminal of the first error amplifier;
- connecting a second feedback network between said output terminal of the first error amplifier and said second input terminal thereof;
- inputting a current cancellation network with the reference voltage and injecting into said second input terminal of the first error amplifier a compensation current which is determined by time variations of a difference between a replica of the output regulated voltage and the reference voltage to inhibit undershoot of the output regulated voltage.

19. The method of claim 18, wherein said current cancellation network is configured to inject into said second input the compensation current determined by increasing time variations of the difference between the replica of the output regulated voltage and the reference voltage.

* * * * *

UNITED STATES PATENT AND TRADEMARK OFFICE
CERTIFICATE OF CORRECTION

PATENT NO. : 8,878,503 B2  
APPLICATION NO. : 13/238436  
DATED : November 4, 2014  
INVENTOR(S) : Zafarana et al.

Page 1 of 1

It is certified that error appears in the above-identified patent and that said Letters Patent is hereby corrected as shown below:

In the Claims

| | |
|---|---|
| Column 6, Line 12, Claim 3 | Delete: "cascade"<br>Insert: --cascode-- |
| Column 7, Line 16, Claim 8 | Delete: "the output the"<br>Insert: --the output of the-- |
| Column 7, Line 44, Claim 13 | Delete: "of voltage"<br>Insert: --of the voltage-- |
| Column 9, Line 5, Claim 18 | Delete: "of voltage"<br>Insert: --of the voltage-- |

Signed and Sealed this  
Twenty-eighth Day of July, 2015

Michelle K. Lee  
*Director of the United States Patent and Trademark Office*